United States Patent [19]

Blackburn et al.

[11] Patent Number: 4,660,252
[45] Date of Patent: Apr. 28, 1987

[54] KNIFE ROLL ASSEMBLY FOR A MEAT TENDERIZER

[75] Inventors: Donald H. Blackburn, Brookville; Fritz F. Treiber, Centerville, both of Ohio

[73] Assignee: Hobart Corporation, Troy, Ohio

[21] Appl. No.: 833,694

[22] Filed: Feb. 27, 1986

[51] Int. Cl.⁴ .............................................. A22C 9/00
[52] U.S. Cl. ...................................... 17/26; 264/261; 264/273
[58] Field of Search ............... 17/25, 26, 27; 264/273, 264/277, 261

[56] References Cited

U.S. PATENT DOCUMENTS

| | | | |
|---|---|---|---|
| 2,605,497 | 8/1952 | Spang | 17/26 |
| 2,886,846 | 5/1959 | Meyer | 17/26 |
| 3,523,992 | 8/1970 | Bickoff | 264/273 X |
| 3,867,502 | 2/1975 | Moody | 264/273 X |

Primary Examiner—Willie G. Abercrombie
Attorney, Agent, or Firm—Biebel, French & Nauman

[57] ABSTRACT

A knife roll assembly for a meat tenderizer includes a plurality of disc-shaped knife blades, each having a peripheral cutting edge and a central shaft-receiving opening. Each of the blades defines a cluster of holes extending through the blade between the opening and the blade periphery. The blades are supported in groups by several molded members that also maintain a predetermined spacing between adjacent blades. The molded material extends radially between adjacent pairs of blades from the central opening and beyond the holes, terminating short of the cutting edges. The molded material further passes through each hole of the blades of a group to define one of a plurality of unitary blade modules, each module including the blade support member and the group of blades interconnected by the member. The modules are placed on a shaft by passing the shaft through the central openings of the blades with the modules disposed with their end surfaces in mutual contact. The modules are secured to the shaft with their end surfaces maintained in contact.

57 Claims, 7 Drawing Figures

KNIFE ROLL ASSEMBLY FOR A MEAT TENDERIZER

BACKGROUND OF THE INVENTION

The present invention relates generally to machines for tenderizing meat or other material through a cutting or slitting action. More specifically, the invention relates to a knife assembly used in carrying out the cutting or slitting operation.

Meat tenderizing machines have been known for some time. One example of such a tenderizing machine is shown in U.S. Pat. No. 2,605,497 issued Aug. 5, 1952 to Spang. The basic machine components disclosed in Spang are still included in most tenderizers of the present day, although the outward appearances of such machines have been modernized.

The typical tenderizing machine includes a chute passing through the machine, into which a piece of meat may be placed for tenderizing. Disposed along the chute is a pair of intermeshed cylindrical knife rolls, each roll being provided with a plurality of cutting or slitting discs that operate upon the meat. The rolls are located along the chute so that meat is passed between the rolls, whereupon a gang cutting operation is performed upon both sides of the meat.

As can be readily appreciated, one important consideration in designing a meat tenderizer is to provide for the relatively convenient cleaning of the knife rolls. The close spacing of the individual blades creates many potential locations for collection of meat particles, with the result that the knife rolls must be carefully cleaned. To facilitate such cleaning, the rolls are typically mounted in a removable unit which may be lifted from the machine. As shown in the Spang patent, the unit is provided with a handle portion, and each knife roll shaft is adapted for quick connection with and disconnection from the machine drive motor. Thus, the entire tenderizing unit may be lifted from the machine and taken to a more convenient location for cleaning.

To ensure that meat particles do not collect along the blades and adversely affect operation between cleanings, each knife roll is accompanied by a comb member disposed adjacent the roll. The comb is provided with a plurality of slots, one slot for each blade on the roll. Rotation of the rolls for tenderizing rotates the knifes through the slots of the comb, thereby stripping any large meat particles from the knife blades.

The typical manner in which a knife roll is assembled is shown in U.S. Pat. No. 2,886,846, issued May 19, 1959 to Meyer. Each knife disc includes a central opening, and is positioned on a shaft for rotation. In order to ensure that the blades remain spaced along the shaft, a spacer disc is positioned between each adjacent pair of blades. After all blades and spacers are located on the shaft, appropriate end fittings are attached to hold the assembly together.

This assembly technique for the knife roll has remained essentially unchanged for some time, notwithstanding the existence of several problems. Because the knife rolls of the pair are positioned in an intermeshing relationship, the spacing between the individual blades of each roll must be substantially uniform to provide proper meshing of the blades. In addition, the spacing must be maintained uniformly along the entire roll to ensure that each blade will pass cleanly through its slot in the corresponding comb. Otherwise, misalignment of one or more blades could cause a blade to contact either another blade on the opposite roll or the comb, possibly resulting in either breaking of one or more blades or jamming of the machine.

In addition, assembly of the knife roll is a tedious task. A typical roll includes approximately 40 blades, which must each be individually stacked, in alternating fashion with spacer discs, onto the roll shaft. Great care must be taken in manufacturing both the individual blades and the spacers, since the approximately 80 elements placed onto each shaft can accumulate tolerances adversely over the length of the shaft, thereby preventing the roll from intermeshing with the opposite roll or comb. The blades and spacers must also be tightly compressed by the end fittings to make certain that the entire roll assembly rotates as a unit, as well as that no meat particles collect between the spacers and knife blades.

As the knife roll is used within the tenderizing machine, the blades will become worn. Such wear is generally most pronounced along the center portion of the roll, along which most of the meat to be tenderized will pass. Further, it is not uncommon for bone chips and other hard particles to be inadvertently passed through the tenderizing machine. Thus, it is not unusual for one or more blades to become broken or bent as the tenderizer is used.

Broken blades can be replaced by disassembling the roll assembly, replacing the blades, and putting the roll assembly back together. However, due to the tedious nature of such a task, as well as the possibility that the reassembled roll may not properly fit with the comb or opposite roll, it is more common for the tenderizer simply to be operated with one or more broken blades. Once a sufficient number of blades has been broken, the entire roll is repaired and/or replaced.

Should blades become bent during tenderizer operations, the machine can no longer be run. The roll then must be repaired or replaced.

In view of the foregoing problems, it can be seen that an improved knife roll assembly is needed that overcomes the disadvantages inherent in assemblies presently in use. Particularly, such an assembly should be simpler and more economical to manufacture, and should be capable of manufacture with more accurate control of blade spacing. Such a roll should also provide for relatively simple replacement of broken, worn or bent blades.

SUMMARY OF THE INVENTION

In meeting the foregoing needs, the present invention provides a knife roll assembly for a meat tenderizer including a plurality of disc-shaped knife blades. Each of the blades has a periphery defining a cutting edge and a central shaft-receiving opening, and the blades are disposed in a predetermined spaced relationship with the openings in axial alignment. The assembly further includes a rotary shaft.

Each blade defines at least one hole or notch extending through the blade along a portion thereof between the opening and the blade periphery or, alternatively, has a roughened surface. A blade support includes a member formed from a molded material for providing and maintaining the predetermined spacing between adjacent blades. The molded material is disposed between each adjacent pair of the blades to extend radially with respect to the blades from the central opening and beyond the hole or notch, but terminates short of the cutting edge. The molded material further passes through each of the holes or notches of the blades, or adheres to the roughened surface, to define a unitary blade module including the blade support and the blades interconnected by the support.

The module is disposed on the shaft by passing the shaft through the shaft-receiving openings of the blades. The assembly further includes means for securing the module to the shaft.

Each of the blades may define a plurality of the holes or notches. The holes extending through each of the blades may be disposed remote from the central opening, or alternatively, may be disposed adjacent the central opening. In the latter case, the holes open into, but are distinct from, the central opening. The holes are disposed symmetrically about each of the blades, and are preferably arranged in a hexagonal pattern around the central opening.

The predetermined spaced relationship for the blades may include a uniform spacing between each adjacent pair of the blades. The blade support member extends beyond each of the endmost blades and defines a pair of planar end surfaces parallel to the blades. Each of the end surfaces is spaced from a corresponding one of the end blades by one-half of the uniform spacing separating adjacent pairs of the blades.

Alternatively, the molded member extends beyond only one of the endmost blades to define one end surface for the module. In this case, the end surface is separated from the blade by the uniform spacing. The opposite end blade itself defines the opposite end surface for the module.

The knife roll assembly for a meat tenderizer may include, instead of a single blade support, a plurality of blade supports. Each supports a portion or group of the blades and includes a member formed from a molded material for providing and maintaining the predetermined spacing between adjacent ones of the blades. The molded material of each of the members further passes through each of the holes of the respective portion of blades to define one of a plurality of unitary blade modules. Each of the modules includes the blade support and the portion of the blades interconnected by the support, as well as a pair of end surfaces. The modules are disposed on the shaft by passing the shaft through the shaft-receiving openings of the modules with the members positioned with their end surfaces in mutual contact. Means is included for securing the modules to the shaft and for maintaining the members in contact.

Accordingly, it is an object of the present invention to provide a knife roll assembly for a meat tenderizer or the like that is relatively simple and economical to manufacture; to provide such an assembly that avoids the present manufacturing technique which requires assembling individual blades and spacers onto a shaft; to provide such an assembly that is capable of manufacture with more accurate control of blade spacing to ensure proper meshing of the roll with an opposing roll or comb assembly; to provide such an assembly in which broken, bent and worn blades may be easily replaced; and to provide such an assembly in which individual blades may be more thoroughly utilized.

Other objects and advantages of the present invention will be readily apparent from the following description, the accompanying drawings and the appended claims.

DETAILED DESCRIPTION OF THE PREFERRED EMBODIMENT

Figure 1:
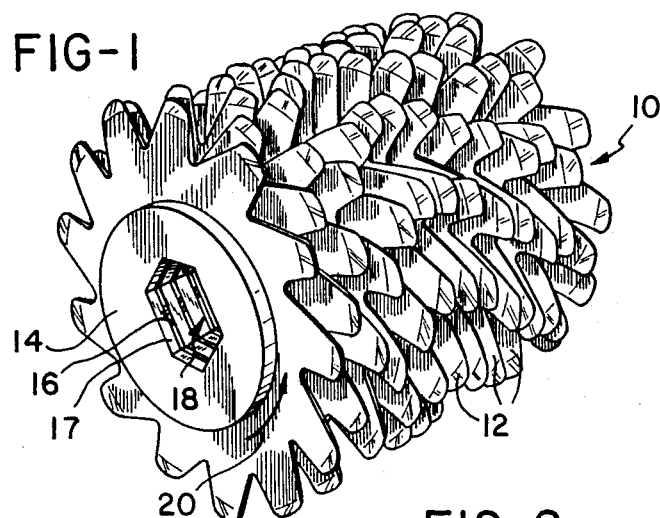
FIG. 1 is a perspective view of a blade module comprising a portion of a knife roll assembly in accordance with the present invention.

Referring now to the drawings, and in particular FIG. 1, a knife module 10 is shown in accordance with the present invention, having a plurality of blades 12 secured in aligned fashion by a support member 14. Each of blades 12 define a central opening 16 and support member 14 defines a central opening 17, which together are aligned to define a shaft-receiving opening 18 extending the full length of module 10. The module is thus adapted to be supported by a shaft for rotation in the direction indicated generally by arrow 20.

Figure 2:
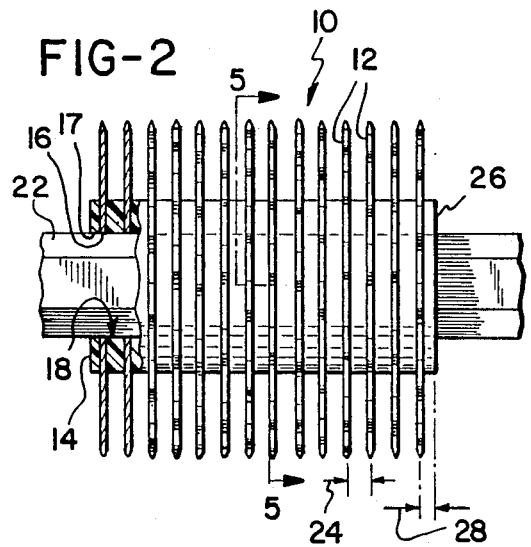
FIG. 2 is a side elevational view of the module of FIG. 1, showing the module carried on a shaft and with an end portion of the module broken away.

Referring now to FIG. 2, module 10 is shown positioned on a shaft 22 extending the full length of opening 18. As can also be seen, supporting member 14 mounts the blades 12 so as to secure the blades with an equal spacing between each adjacent pair of blades 12. In a preferred embodiment, the center-to-center spacing between an adjacent pair of blades 12, indicated at 24, is 0.176" (4.47 mm). The preferred spacing between the end surface 26 of knife support member 14 and the endmost blade 12, indicated generally at 28, is 0.088" (2.23 mm). These preferred dimensions are selected to correspond to typical blade spacings for tenderizers presently in commercial use. Of course, other dimensions may be selected as desired.

It is preferred that each module 10 be provided with approximately ten to fifteen blades secured by the support member 14. However, this produces a module 10 which is substantially shorter than a complete knife roll used within a tenderizer machine. Such a complete roll normally provides approximately forty blades, and it is entirely possible to form a single module 10 having the necessary 40 blades.

Figure 3:
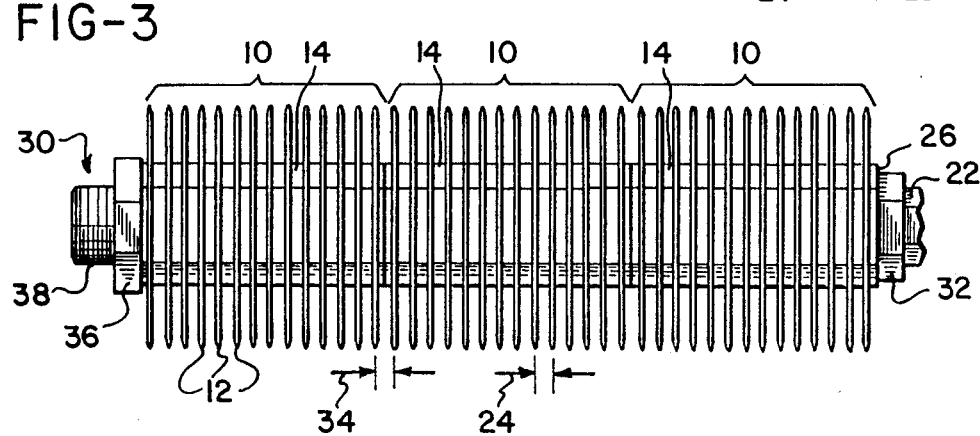
FIG. 3 is a side elevational view of the knife roll assembly.

As shown in FIG. 3, a complete knife roll 30 is preferably produced by placing a plurality of modules 10 along a single shaft 22. Shaft 22 is provided at one end with an appropriate abutment member 32, against which one of the modules 10 is placed. Successive modules 10 are positioned against each other with the end faces 26 of their respective support members 14 being disposed in contact with each other. Thus it is preferred that, regardless of the specific dimensions selected, the spacing between end face 26 of support member 14 and the endmost blade 12 be half that of the spacing between adjacent pairs of blades 12. As a result, the endmost blades on adjacent modules 10 have an indentical spacing 34 to that between adjacent blades on a single module 10.

Alternatively, each module may be formed with the spacing between one end face 26 of support member 14 and endmost blade 12 be equal to the normal spacing between blades. In such a case, the opposite endmost blade itself serves as the opposite end face for the module. This arrangement is somewhat more restrictive, in that the modules must be properly oriented when placed on shaft 22, although this can be an advantage in some cases in ensuring proper rotational direction for the blades 12.

The adjacent modules 10 are secured in position by a securing means placed at the end of shaft 22. In FIG. 3, as an example, a nut 36 fittable on a threaded portion 38 of shaft 22 is shown. However, a wide variety of appropriate securing means may be used. In view of the prior art construction of knife rolls wherein individual blades and spacers are secured to a shaft by a securing means, a wide variety of possible securing means is known in the art.

Assembled knife rolls 30 may be installed within a tenderizer machine to operate to tenderize meat and other materials in a known manner. In general, referring to FIG. 4, a pair of knife rolls 30 are mounted such that the blades 12 of the rolls 30 intermesh. Shafts 22 supporting rolls 30 are counter-rotated, as indicated generally by arrows 40, and pieces of meat or other material are passed into the intermeshed portion of blades 12 as indicated by arrow 42. Knife rolls 30 then engage the material to be tenderized, passing it through the blades 12 and out of the machine. In addition, a comb block 44 is provided for each roll 30, including a plurality of slots (not shown) through which each blade 12 must pass. These slots serve to remove meat or other material particles which may become lodged between the blades 12 as the tenderizer is operating.

Figure 4:
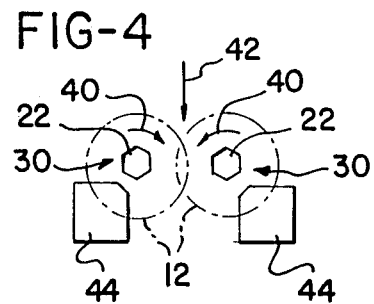
FIG. 4 is a schematic view of a meat tenderizing machine with which the present invention may be used.

One advantage of the present invention can be recognized from FIGS. 3 and 4. It can be seen that all meat to be tenderized must pass over the central portion of the roll 30, regardless of the width of the meat portions, while only relatively wide portions will traverse the outer portions of the roll. Thus, the central section of the roll will be subjected to the greatest wear, and inner blades will require replacement prior to outer blades. Due to the tediousness of roll assembly, it has been customary to replace the entire roll when the inner blades have become worn, rather than only those blades which require replacement. Using a roll 30 as shown in FIG. 3, however, one can replace only the central module 10 should the blades on such module become worn. Further, the outer modules can be turned around to move the outermost blades to a more central location, providing more even wear and more efficient blade usage. Also, modules can be interchanged along shaft 22 to move, for example, an outer module to the central position.

Figure 5:
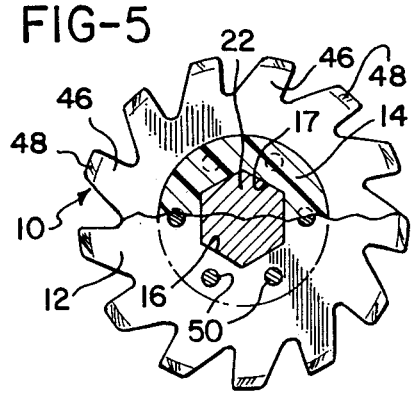
FIG. 5 is a sectional view taken generally along line 5—5 of FIG. 2.

Further detail regarding the construction of module 10 can be seen by reference to FIG. 5. Each blade 12, which is generally disc-shaped, is provided with a plurality of notches defining blade teeth 46 therebetween, each tooth having a cutting edge 48 formed on its periphery. Blades 12 are shown having thirteen teeth 46 on each blade, but it should be recognized that a variety of different blade configurations can be and typically are used within tenderizing equipment. For example, blades 12 may be completely disc-shaped, having but a single cutting edge and no teeth. Alternatively, blades 12 may be star-shaped, having, for example, five teeth 48 on each blade. Such blade types, as well as many others, are well known within the art.

Further, it should be recognized that the term "blade" as used herein may also refer to disc-shaped members having other than a cutting surface, but used nonetheless within tenderizing equipment. For example, "blades" could be back-up roller segments arranged on a shaft for cooperation with blades for strip cutting, such as with food used in salads. Thus, each "blade" defines a working portion at its periphery, which may or may not be a true cutting edge. However, such "blades" are regarded as within the scope of the present invention.

Each blade 12 used within a module 10 is stamped from stainless steel stock having relatively small thickness tolerance, e.g., ±0.0005" (0.013 mm). As each blade 12 is produced, the central opening 16 is also formed. In the preferred embodiment, opening 16 is hexagonal, selected to provide for driving engagement of the finished module 10 with a hexangonal shaft 22. Of course, it will be recognized that other configurations for opening 16 (and shaft 22) are possible, such as triangular or square. In general, the selected shape should provide corners for engagement. A circular opening 16 may be used, although such a shape is less preferred since the module 10 must be more tightly secured to shaft 22 to ensure that it rotates with shaft 22 when driven thereby.

It is possible to provide openings 16 larger than the cross-sectional area of shaft 22. In such a case, driving engagement of the shaft with the module is solely with the molded portion of the module.

Along with central opening 16, each blade 12 is provided with a plurality of holes 50 formed through blade 12 between opening 16 and the outer periphery of the blade. Preferably, holes 50 are formed between opening 16 and the base of the notches defining fingers 46. Holes 50 and support member 14 cooperate to provide a rigid structure for module 10.

Blade support member 14 is formed from a molded material, preferably a plastic material, and most preferably Celcon M90-04 (natural). The molded material of support member 14 is disposed between each adjacent pair of blades 12, and extends radially outwardly along each blade 12 from opening 16 toward the periphery at which teeth 46 and cutting edges 48 are located. Further, member 14 extends over and beyond each of the holes 50, and the molded plastic material passes through the holes 50. This defines a unitary member 14 which securely positions and retains each of the blades 12 in their relative positions.

The molded material of member 14 preferably does not extend into the area defined by central opening 16. Thus, when module 10 is completed, the shaft-receiving opening 18 (see FIG. 1) is defined, and the shaft will contact the steel blades during driving of the module. However, as has been noted, it is possible to extend the molded material beyond the central openings in blades 12, provided the openings 16 are larger than the shaft 22, such that the engaged shaft contacts only molded material. In this case, the reinforcing effect caused by the blades is lost, but such an approach is usable.

Figure 5A:
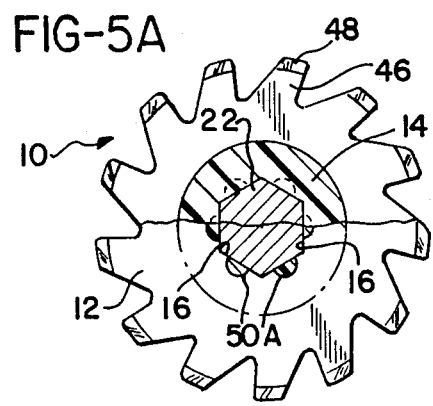
FIG. 5A is a sectional view similar to FIG. 5 illustrating an alternative embodiment for the module.

It should be recognized that it is not necessary for holes 50 to be disposed on each blade 12 in the exact number and positions shown in FIG. 5. What is important is that holes 50 be provided for allowing the plastic material of member 14 to secure the blades in place to define module 10. For example, an alternative embodiment is shown in FIG. 5A wherein holes 50a are provided to effectively define notches extending further into blade 12 from central opening 16. These holes or notches 50a, when filled with the plastic material of support member 14, serve in a manner identical to holes 50 of FIG. 5 for defining the unitary structure of module 10.

It can be seen that a wide variety of alternatives exist for the holes 50, including those shown in FIGS. 5 and 5A. For example, support member 14 could be extended radially outward to beyond the base of blade teeth 46. In such a case, the molded material will then fill the bases of the notches defining the separation between each pair of teeth, producing the same effect as flow through holes 50 or 50a. More material must be used for each module, but no holes need be formed into blades 12. Similarly, if the molded material is extended inwardly beyond central openings 16, flow of material around the individual blades will occur to hold the completed module together.

As a further example of a suitable alternative to holes 50 and 50a, blades 12 can be provided with roughened surfaces, particularly in the vicinity of central open; 16. The molded material will then be enabled to grip the blade surfaces sufficiently to hold the module as an integral unit.

It should be noted, however, that it is generally desirable for some portion of blade 12 to be adjacent shaft 22 when module 10 is in position on the shaft, particularly at the corner regions of a non-circular opening 16. Since the driving force of shaft 22 is typically exerted most strongly at the corner regions, it is desirable to provide the additional strength of the metallic blades 12 along opening 16.

It is also desirable that holes 50 be arranged on each blade 12 symmetrically around opening 16. This will ensure that the strength of the module 10 will be kept relatively uniform about the entire module. Six holes have been found to be adequate, arranged hexagonally to correspond to the shape of opening 16, and are therefore preferred. Other arrangements may be also be suitable.

One method of making the knife blade module 10 will be described with reference to FIG. 6. While this method represents the preferred method for making the module, it is merely exemplary. Other satisfactory methods may be devised by those skilled in the art.

Figure 6:
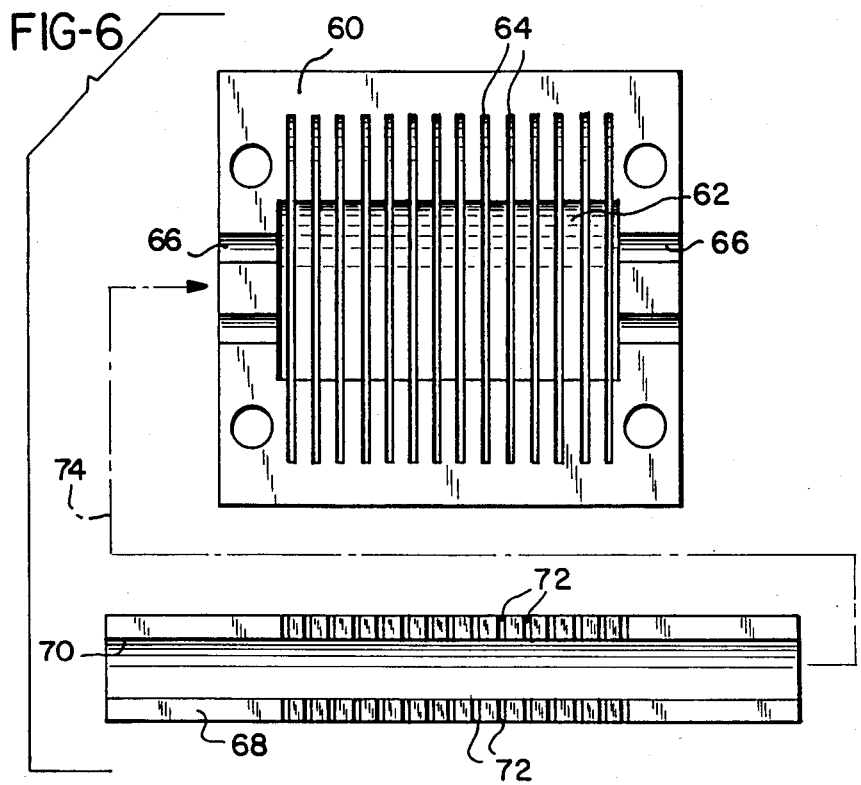
FIG. 6 is a plan view of an apparatus for forming a module for the assembly.

A pair of cooperating mold halves are used in the method, with one half 60 being shown in FIG. 6. A semi-cylindrical main cavity 62 is defined, with a plurality of narrow, deeper semi-circular slots 64 arranged along the length of cavity 62. Cavity 62 is formed to a depth equal to the desired radius for support member 14, while each slot 64 is formed to a width equal to blade thickness and a depth equal to the radius of blades 12. End openings 66 are provided to open into cavity 62, with each opening 66 having a half-hexagonal configuration corresponding to one-half of the opening 16 (or shaft 22).

The apparatus further includes a split runner block 68 formed in two halves or pieces. One-half of block 68 is shown in FIG. 6, with the understanding that the opposite half is identical. A semi-cylindrical flow cavity 70 extends the length of block 68, and the outer configuration of block 68, when the two halves of block 68 are assembled, is identical to that of shaft 22 with which the completed module 10 is to be used. A plurality of pinpoint gates 72 are provided along block 68, to open from cavity 70 to the exterior of block 68. Gates 72 are provided with spacings equal to the desired spacings for blades 12 on the completed module 10.

In producing the module 10, the halves of block 68 are placed together, and the proper number of blades 12 for module 10 are placed onto block 68 by inserting the block through the hexagonal opening 16 in each blade 12. Because opening 16 is hexagonal, while each blade 12 is provided with thirteen teeth 46, it can be seen that a generally random distribution of blade orientations along the module 10 can be produced simply by placing the blades on block 68 without regard to their orientation. Such an arrangement is desirable in terms of performance of the module 10 in operating upon meat or other material to be tenderized. (Of course, the blades can be arranged with teeth aligned if desirable.)

The block 68 and blades 12 are next positioned within one half 60 of the mold. Each blade 12 is fitted into one of slots 64. Alternatively, blades 12 may be initially placed within slots 64 with block 68 inserted through the blades as indicated generally by arrow 74. Blades 12 fit snugly within slots 64, and the opposite half 60 of the mold is positioned to close the mold.

The mold is next heated, one end of cavity 70 in block 68 is closed, and a molten plastic material is introduced under pressure into the opposite end of cavity 70. Because of the relatively small size of gates 72, the entire interior of cavity 70 will tend to fill with the plastic material, thereby equalizing the pressure within opening 70 so that material emerges through each gate 72 in generally uniform fashion. Because block 68 is positioned within the mold so that each gate 72 opens between an adjacent pair of blades, the plastic material flows into each gap between blades as it fills the mold. Since the material is under pressure, it also flows into the openings 50 defined through each blade to connect the portions of material and form the unitary support member 14.

The mold is next cooled, whereupon the plastic material solidifies. Runner block 68 is pressed out of the mold through openings 66. Because of the relatively small size of gates 72, the plastic spurs formed through these gates are easily broken as block 68 passes out of the mold. The mold is then opened and the finished module 10 is removed.

It should be recognized that one advantage of the formation technique described above is that the broken connection points from the plastic spurs are all located along a portion of member 14 which will be shielded from the food material by shaft 22. This is important, in that such connection points frequently result in rough edges which could tend to collect food particles through use of the module 10, increasing the difficulty of keeping the apparatus thoroughly clean.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. An integral circular knife module for a meat tenderizer or the like, for mounting on a rotary shaft for driving said module to perform a gang-cutting action on material passing between said module and a back-up member, including:

a plurality of disc-shaped, uniformly spaced knife blades on a common axis, each of said blades having working portions at its periphery and defining a central shaft-receiving blade opening;

the improvement comprising:

a blade support including a molded member for providing the axial spacing between adjacent ones of said blades;

means for providing gripping of said blades by said molded member;

said molded member further defining a central shaft-receiving molded opening and extending radially outward from said central molded opening and terminating not farther than said working portions, said molded member having material engaging said gripping means to provide a unitary molded member interconnecting said blades in integral fashion.

2. A knife module as defined in claim 1, wherein the shaft defines a shaft cross section, and said central molded opening and each of said central blade openings are of an area substantially the same as said shaft cross section and coincident along a single axis.

3. A knife module as defined in claim 1, wherein said gripping means includes at least one hole defined through each of said blades, said molded member extending radially outward beyond said holes, said molded member further having material passing through said holes of each of said blades to provide said unitary molded member.

4. The knife module as defined in claim 3, wherein said hole extending through each of said blades is disposed remote from said central blade opening.

5. The knife module as defined in claim 3, wherein each of said blades defines a plurality of said holes.

6. The knife module as defined in claim 5, wherein said holes are disposed symmetrically about each of said blades.

7. The knife module as defined in claim 6, wherein each of said blades defines six of said holes arranged in a hexagonal pattern around said central blade opening.

8. A knife module as defined in claim 1, wherein said gripping means includes at least one notch defined into each of said blades, said notch extending radially outward from said central blade opening, said molded member further having material passing through said notches of each of said blades to provide said unitary molded member.

9. A knife module as defined in claim 1, wherein:

each of said blades defines a plurality of notches extending inwardly from said blade periphery for defining a plurality of blade teeth, each of said notches having a base at the innermost portion thereof;

said gripping means includes said notches; and said molded member further has material passing through said bases of said notches to provide said unitary molded member.

10. A knife module as defined in claim 1, wherein:

the shaft defines a shaft cross section;

each of said central blade openings is of an area larger than said shaft cross section;

said central molded opening is of an area substantially the same as said shaft opening;

said gripping means includes said central blade openings; and said molded member further has material passing through a portion of each of said central blade openings to further define said central molded opening and to grip said blades to provide said unitary molded member.

11. A knife module as defined in claim 1, wherein each of said blades defines a roughened surface at least in the vicinity of said central blade opening, and said gripping means includes said roughened surface, said molded member having molded material engaging said roughened surface to provide said unitary molded member.

12. A knife module as defined in claim 1, wherein said central shaft-receiving opening is non-circular.

13. A knife module as defined in claim 12, wherein said non-circular opening is hexagonal.

14. The knife module as defined in claim 1, wherein said molded member is formed from a thermoplastic material.

15. The knife module as defined in claim 1, wherein each of said blades defines a plurality of notches extending inwardly from said blade periphery for defining a plurality of blade teeth, each of said notches having a base at the innermost portion thereof.

16. The knife module as defined in claim 15, wherein said molded member extends radially with respect to said blades to terminate short of any of said bases of said notches.

17. The knife module as defined in claim 1, wherein said predetermined spaced relationship for said blades includes a uniform spacing between each adjacent pair of said blades.

18. The knife module as defined in claim 17, wherein:

said blades are further disposed to define a pair of end blades;

said blade support member extends beyond each of said end blades and defines a pair of planar end surfaces parallel to said blades; and each of said end surfaces is disposed from a corresponding one of said end blades by one-half of said uniform spacing separating adjacent pairs of said blades.

19. The knife module as defined in claim 17, wherein:

said blades are further disposed to define a first and second end blade;

said blade support member extends beyond said first end blade and defines a first planar end surface parallel to said blades;

said first end surface is disposed from said first end blades by said uniform spacing separating adjacent pairs of said blades; and a second planar end surface is defined by said second end blade.

20. In a knife roll assembly for a meat tenderizer, including:

a plurality of disc-shaped knife blades, each of said blades having a periphery defining a cutting edge and a central shaft-receiving blade opening; and a rotary shaft;

said blades being disposed in a predetermined spaced relationship and with said openings in axial alignment;

improvement comprising:

a blade support including a member formed from a molded material for providing the axial spacing between adjacent ones of said blades; and means for providing gripping of said blades by said molded material;

said molded member further defining a central shaft-receiving molded opening and extending radially outward from said central molded opening and terminating not farther than said working portions, said molded material engaging said gripping means to define a unitary blade module including said blade support and said blades interconnected by said support;

said module being disposed on said shaft by passing said shaft through said shaft-receiving molded opening; and means for securing said module to said shaft.

21. A knife roll assembly as defined in claim 20, wherein said shaft defines a shaft cross section, and said central molded opening and each of said central blade openings are of an area substantially the same as said shaft cross section and coincident along a single axis.

22. A knife roll assembly as defined in claim 20, wherein said gripping means includes at least one hole defined through each of said blades, said molded material extending radially outward beyond said holes, said molded material further passing through said holes of each of said blades to provide said unitary module.

23. The knife roll assembly as defined in claim 22, wherein said hole extending through each of said blades is disposed remote from said central opening.

24. The knife roll assembly as defined in claim 22, wherein each of said blades defines a plurality of said holes.

25. The knife roll assembly as defined in claim 24, wherein said holes are disposed symmetrically about each of said blades.

26. The knife roll assembly as defined in claim 25, wherein each of said blades defines six of said holes arranged in a hexagonal pattern around said central opening.

27. A knife roll assembly as defined in claim 20, wherein said gripping means includes at least one notch defined into each of said blades, said notch extending radially outward from said central blade opening, said molded material passing through said notches of each of said blades to provide said unitary molded module.

28. A knife roll assembly as defined in claim 20, wherein:

each of said blades defines a plurality of notches extending inwardly from said blade periphery for defining a plurality of blade teeth, each of said notches having a base at the innermost portion thereof;

said gripping means includes said notches; and said molded material passes through said bases of said notches to provide said unitary molded module.

29. A knife roll assembly as defined in claim 20, wherein:

the shaft defines a shaft cross section;

each of said central blade openings is of an area larger than said shaft cross section;

said central molded opening is of an area substantially the same as said shaft opening;

said gripping means includes said central blade openings; and said molded material passes through a portion of each of said central blade openings to further define said central molded opening and to grip said blades to provide said unitary molded module.

30. A knife roll assembly as defined in claim 20, wherein each of said blades defines a roughened surface at least in the vicinity of said central blade opening, and said gripping means includes said roughened surface, said molded material engaging said roughened surface to provide said unitary molded module.

31. A knife roll assembly as defined in claim 20, wherein said central shaft-receiving opening is non-circular.

32. A knife roll assembly as defined in claim 31, wherein said non-circular opening is hexagonal.

33. The knife roll assembly as defined in claim 20, wherein said molded member is formed from a thermoplastic material.

34. The knife roll assembly as defined in claim 20, wherein each of said blades defines a plurality of notches extending inwardly from said blade periphery for defining a plurality of blade teeth, each of said notches having a base at the innermost portion thereof.

35. The knife roll assembly as defined in claim 34, wherein said molded material extends radially with respect to said blades to terminate short of any of said bases of said notches.

36. The knife roll assembly as defined in claim 20, wherein said predetermined spaced relationship for said blades includes a uniform spacing between each adjacent pair of said blades.

37. The knife roll assembly as defined in claim 36, wherein:

said blades are further disposed to define a pair of end blades;

said blade support member extends beyond each of said end blades and defines a pair of planar end surfaces parallel to said blades; and each of said end surfaces is disposed from a corresponding one of said end blades by one-half of said uniform spacing separating adjacent pairs of said blades.

38. The knife module as defined in claim 36, wherein:

said blades are further disposed to define a first and second end blade;

said blade support member extends beyond said first end blade and defines a first planar end surface parallel to said blades;

said first end surface is disposed from said first end blades by said uniform spacing separating adjacent pairs of said blades; and a second planar end surface is defined by said second end blade.

39. A knife roll assembly for a meat tenderizer, comprising:

a plurality of disc-shaped knife blades, each of said blades having a periphery defining a working portion and a central shaft-receiving blade opening;

a rotary shaft;

a plurality of blade supports;

each of said blade supports supporting a portion of said blades and including a member formed from a molded material for providing the axial spacing between adjacent ones of said blades; and means for providing gripping of said blades by said molded material;

said molded member of each of said supports further defining a central shaft-receiving molded opening and extending radially outward from said central molded opening and terminating not farther than said working portions of said blades, said molded material engaging said gripping means to define one of a plurality of unitary blade modules including said blade support and said blades interconnected by said support;

each module further defining a pair of end blades therefor, and including first and second end surfaces;

said modules being disposed on said shaft by passing said shaft through said shaft-receiving molded openings with said members disposed with opposing ones of said end surfaces in mutual contact; and means for securing said modules to said shaft and for maintaining said members in contact.

40. A knife roll assembly as defined in claim 39, wherein said shaft defines a shaft cross section, and each of said central molded openings and said central blade openings are of an area substantially the same as said shaft cross section and coincident along a single axis.

41. A knife roll assembly as defined in claim 39, wherein said gripping means includes at least one hole defined through each of said blades, said molded material extending radially outward beyond said holes, said molded material further passing through said holes of each of said blades to provide said unitary modules.

42. The knife roll assembly as defined in claim 41, wherein said hole extending through each of said blades is disposed remote from said central blade opening.

43. The knife roll assembly as defined in claim 41, wherein each of said blades defines a plurality of said holes.

44. The knife roll assembly as defined in claim 43, wherein said holes are disposed symmetrically about each of said blades.

45. The knife roll assembly as defined in claim 44, wherein each of said blades defines six of said holes arranged in a hexagonal pattern around said central blade opening.

46. A knife roll assembly as defined in claim 39, wherein said gripping means includes at least one notch defined into each of said blades, said notch extending radially outward from said central blade opening, said molded material passing through said notches of each of said blades to provide said unitary molded modules.

47. A knife roll assembly as defined in claim 39, wherein:
each of said blades defines a plurality of notches extending inwardly from said blade periphery for defining a plurality of blade teeth, each of said notches having a base at the innermost portion thereof;
said gripping means includes said notches; and
said molded material passes through said bases of said notches to provide said unitary molded modules.

48. A knife roll assembly as defined in claim 39, wherein:
the shaft defines a shaft cross section;
each of said central blade openings is of an area larger than said shaft cross section;
said central molded openings are of an area substantially the same as said shaft opening;
said gripping means includes said central blade openings; and
said molded material passes through a portion of each of said central blade openings to further define said central molded openings and to grip said blades to provide said unitary molded modules.

49. A knife roll assembly as defined in claim 39, wherein each of said blades defines a roughened surface at least in the vicinity of said central blade opening, and said gripping means includes said roughened surface, said molded material engaging said roughened surface to provide said unitary molded modules.

50. A knife roll assembly as defined in claim 39, wherein said central shaft-receiving openings are non-circular.

51. A knife roll assembly as defined in claim 50, wherein said non-circular openings are hexagonal.

52. The knife roll assembly as defined in claim 39, wherein said molded members are formed from a thermoplastic material.

53. The knife roll assembly as defined in claim 39, wherein each of said blades defines a plurality of notches extending inwardly from said blade periphery for defining a plurality of blade teeth, each of said notches having a base at the innermost portion thereof.

54. The knife roll assembly as defined in claim 53, wherein each of said molded members extend radially with respect to said blades to terminate short of any of said bases of said notches.

55. The knife roll assembly as defined in claim 39, wherein said predetermined spaced relationship for said blades includes a uniform spacing between each adjacent pair of said blades on each of said members.

56. The knife roll assembly as defined in claim 55, wherein:
said first and second end surfaces of each of said modules are parallel to said blades thereof; and
each of said end surfaces is disposed from a corresponding one of said end blades by one-half of said uniform spacing separating adjacent pairs of said blades.

57. The knife module as defined in claim 55, wherein:
said blades are further disposed to define a first and second end blade for each of said modules;
each of said blade support members extends beyond said first end blade and defines a first planar end surface parallel to said blades;
each of said first end surfaces is disposed from said first end blades by said uniform spacing separating adjacent pairs of said blades; and
a second planar end surface is defined for each of said modules by each of said second end blades.

* * * * *